US007208103B2

(12) United States Patent
Manivannan et al.

(10) Patent No.: US 7,208,103 B2
(45) Date of Patent: Apr. 24, 2007

(54) QUANTUM-SPLITTING FLUORIDE-BASED PHOSPHORS, METHOD OF PRODUCING, AND DEVICES INCORPORATING THE SAME

(75) Inventors: Venkatesan Manivannan, Rexford, NY (US); Alok Mani Srivastava, Niskayuna, NY (US); Holly Ann Comanzo, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 305 days.

(21) Appl. No.: 10/917,127

(22) Filed: Aug. 13, 2004

(65) Prior Publication Data

US 2006/0033070 A1    Feb. 16, 2006

(51) Int. Cl.
*C09K 11/61*    (2006.01)
*C09K 11/55*    (2006.01)
*C09K 11/64*    (2006.01)
*C09K 11/62*    (2006.01)

(52) U.S. Cl. .............................. 252/301.4 H; 313/467; 313/468; 313/486; 313/487; 252/301.4 R; 252/301.4 P; 252/301.5; 252/301.4 F

(58) Field of Classification Search ................ 313/467, 313/468, 486, 487; 252/301.4 H, 301.4 P, 252/301.4 R, 301.5, 301.4 F; 423/263, 464, 423/465, 472
See application file for complete search history.

(56) References Cited

OTHER PUBLICATIONS

A. P. Vink et al., "Photon Cascade Emission in SrAlF5:Pr3+", J. Phys., Condens. Matter., vol. 14, 8889-8899 (2002).
E. van der Kolk et al., "Luminescence Exciation Studyb of the Higher Energy States of Pr3+ and Mn2+ in SrAlF5, CaAlF5, and NaMgF3", J. Appl. Phys., vol. 95, No. 12, 7867-7872 (2004).
F. Kubel, "The Crystal Structures of SrAlF5 and Ba0.43(1)Sr0.57(1)AlF5", Z. Anorg. Allg. Chem., vol. 624, 1481-1486 (1998).
E. van der Kolk et al., "Vacuum Ultraviolet Excitation and Quantum Splitting of Pr3+ in LaZrF7 and α-LaZr3F15", Optics Comm., vol. 197, 317-326 (2001).

*Primary Examiner*—C. Melissa Koslow
(74) *Attorney, Agent, or Firm*—Jason K. Klindtworth; Jean K. Testa

(57) ABSTRACT

A quantum-splitting phosphor has a formula of $ADF_5:Pr^{3+}$, wherein A is at least one alkaline-earth metal and D is at least one Group-IIIB metal. The phosphor is made in a solid-state method without using hazardous HF gas. The phosphor can be used alone or in conjunction with other phosphors in light sources and displays wherein it can be excited by VUV radiation, and increase the efficiency of these devices.

21 Claims, 5 Drawing Sheets

QUANTUM-SPLITTING FLUORIDE-BASED PHOSPHORS, METHOD OF PRODUCING, AND DEVICES INCORPORATING THE SAME

BACKGROUND OF THE INVENTION

This invention relates to quantum-splitting fluoride-based phosphors. More particularly, the phosphors are fluorides doped with $Pr^{3+}$. This invention also relates to method of producing and blends comprising such phosphors.

The conversion of a single ultraviolet ("UV") photon into two visible photons with the result that the quantum efficiency of luminescence exceeds unity is termed "quantum splitting." Quantum splitting materials are very desirable for use as phosphors for lighting applications, such as fluorescent lamps. A suitable quantum splitting phosphor can, in principle, produce a significantly brighter fluorescent light source due to higher overall luminous output because it can convert to visible light the part of UV radiation that is not absorbed efficiently by traditional phosphors currently used in commercial fluorescent lamps. Quantum splitting has been demonstrated previously in certain fluoride- and oxide-based materials. A material comprising 0.1% $Pr^{3+}$ in a matrix of $YF_3$ has been shown to generate more than one visible photon for every absorbed UV photon when excited with radiation having a wavelength of 185 nm. The measured quantum efficiency of this material was 140%, and thus greatly exceeded unity. However, this material did not show sufficient stability to permit its use as a phosphor in fluorescent lamps because of its tendency to react with mercury vapor. Recently, lanthanum magnesium borate and strontium magnesium aluminate, both activated with $Pr^{3+}$, have been shown to exhibit quantum-splitting behavior. Emission spectra of these materials exhibit a large peak at wavelength of about 405 nm, which is characteristic of quantum splitting. However, these materials still exhibit a considerable emission in the UV wavelength range of less than 350 nm. This part of the emission reduces the overall visible light output that otherwise can be higher.

Recently, light sources based on mercury-free discharges have become important. A large portion of the emission of these discharges is typically in the vacuum UV range ("VUV"), which emission can be converted very efficiently by quantum-splitting phosphors to visible light. Therefore, the quest for improved quantum-splitting phosphors continues. It is also desirable to provide more energy-efficient light sources using quantum-splitting phosphors having higher quantum efficiency. It is further desirable to provide environmentally friendly methods for producing such phosphors.

SUMMARY OF THE INVENTION

The present invention provides fluoride-based quantum-splitting phosphors that are activated with $Pr^{3+}$.

In one aspect, a quantum-splitting phosphor of the present invention has a formula of $ADF_5:Pr^{3+}$; wherein A is at least one alkaline-earth metal and D is at least one Group 13 metal. As used herein, the group number of the Periodic Table follows the designation by the International Union of Pure and Applied Chemistry. In the formula of the phosphor, the ion following the semicolon designates the activator.

In another aspect, the quantum-splitting phosphor has a formula of $SrAlF_5:Pr^{3+}$.

In still another aspect, a method for producing a phosphor comprises: (a) providing in sealed container a mixture of fluoride compounds of each of: (1) praseodymium; (2) at least an alkaline-earth metal; and (3) at least a Group-IIIB metal; the sealed container containing an atmosphere consisting essentially of inert gas; and (b) heating the mixture in the sealed container to a temperature for a time sufficient to convert the mixture to a single-phase solid fluoride of said at least an alkaline-earth metal and said at least a Group-IIIB metal, the single-phase solid fluoride being doped with praseodymium ions.

In yet another aspect, a phosphor blend comprises a fluoride-based quantum-splitting phosphor that is activated with $Pr^{3+}$ and at least another phosphor that emit light having a color selected from the group consisting of blue, green, yellow, and red. The fluoride-based quantum-splitting phosphor has a formula of $ADF_5:Pr^{3+}$; wherein A is at least one alkaline-earth metal and D is at least one Group-IIIB metal.

In yet another aspect, a light source comprises a gas discharge that emits radiation in the VUV range and a fluoride-based quantum-splitting phosphor that is disposed to absorb the VUV radiation and emit visible light.

Other benefits of this invention may become evident upon a perusal of the description and appended claims together with the attached drawings.

DETAILED DESCRIPTION OF THE PREFERRED EMBODIMENT

In general, the present invention provides fluoride-based quantum-splitting phosphors that are activated with praseodymium ion.

In one aspect, a quantum-splitting phosphor of the present invention has a formula of $ADF_5:Pr^{3+}$; wherein A is at least one alkaline-earth metal and D is at least one Group-IIIB metal. The doping level for $Pr^{3+}$ is in the range from about 0.01 mole percent to 10 mole percent, preferably from about 0.1 mole percent to 5 mole percent, and more preferably from about 0.1 mole percent to about 2 mole percent.

A quantum-splitting phosphor of the present invention may be represented by the formula $A_{1-1.5x}Pr_xDF_5$; wherein A is at least one alkaline-earth metal, D is at least one Group-IIIB metal, and x is in the range from about 0.0001 to about 0.1.

In one aspect, A is at least one alkaline-earth metal selected from the group consisting of Sr, Ba, Ca, Mg, and combinations thereof.

More particularly, in one aspect, A is a combination selected from the group consisting of Sr and Ba; Sr and Ca; Sr and Mg; Ba and Ca; Ba and Mg; Ca and Mg; Sr, Ba, and Ca; Sr, Ba, and Mg; Ba, Ca, and Mg; and Sr, Ba, Ca, and Mg.

In another aspect, D is at least a Group-IIIB metal selected from the group consisting of Al, Ga, In, and combination thereof.

Without limitation, the quantum-splitting behavior of phosphors is attributed to the VUV excitation of the $Pr^{3+}$ ion within the fluoride lattice. Therefore, fluorides of the present invention should be processed so as to maintain praseodymium as $Pr^{3+}$ ion within the fluoride lattice.

Figure 1:
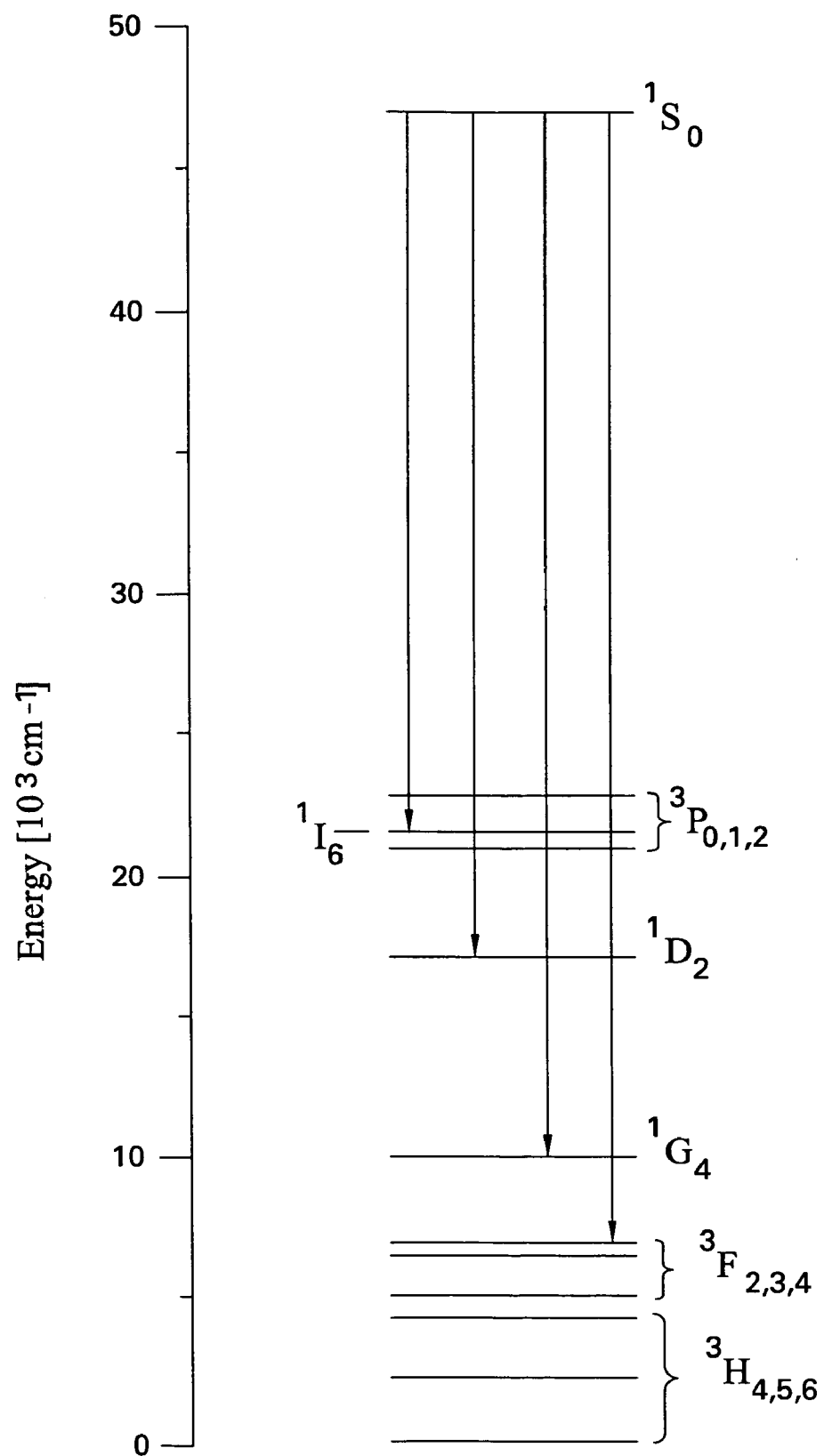
FIG. 1 is a diagram showing energy levels of excited $Pr^{3+}$ ion.

FIG. 1 shows the energy levels of $Pr^{3+}$ ion. Although the applicants do not wish to be bound by any particular theory, it is believed that the quantum-splitting phosphors of the present invention offer quantum efficiency higher than unity because the $Pr^{3+}$ ion excited by VUV emits two visible photons as it decays back to its ground state through the following process. The excited $Pr^{3+}$ ion in the 4f5d band decays non-radiatively to the $^1S_0$ state from which it radiatively decays to the $^1I_6$ energy level and concurrently emits the first visible photon. The $Pr^{3+}$ ion then non-radiatively decays from the $^1I_6$ energy level to the $^3P_0$ energy level from which it further radiatively decays to $^3H_4$, $^3H_5$, $^3H_6$, and $^3F_2$ levels and concurrently emits the second visible photon.

Figure 2:
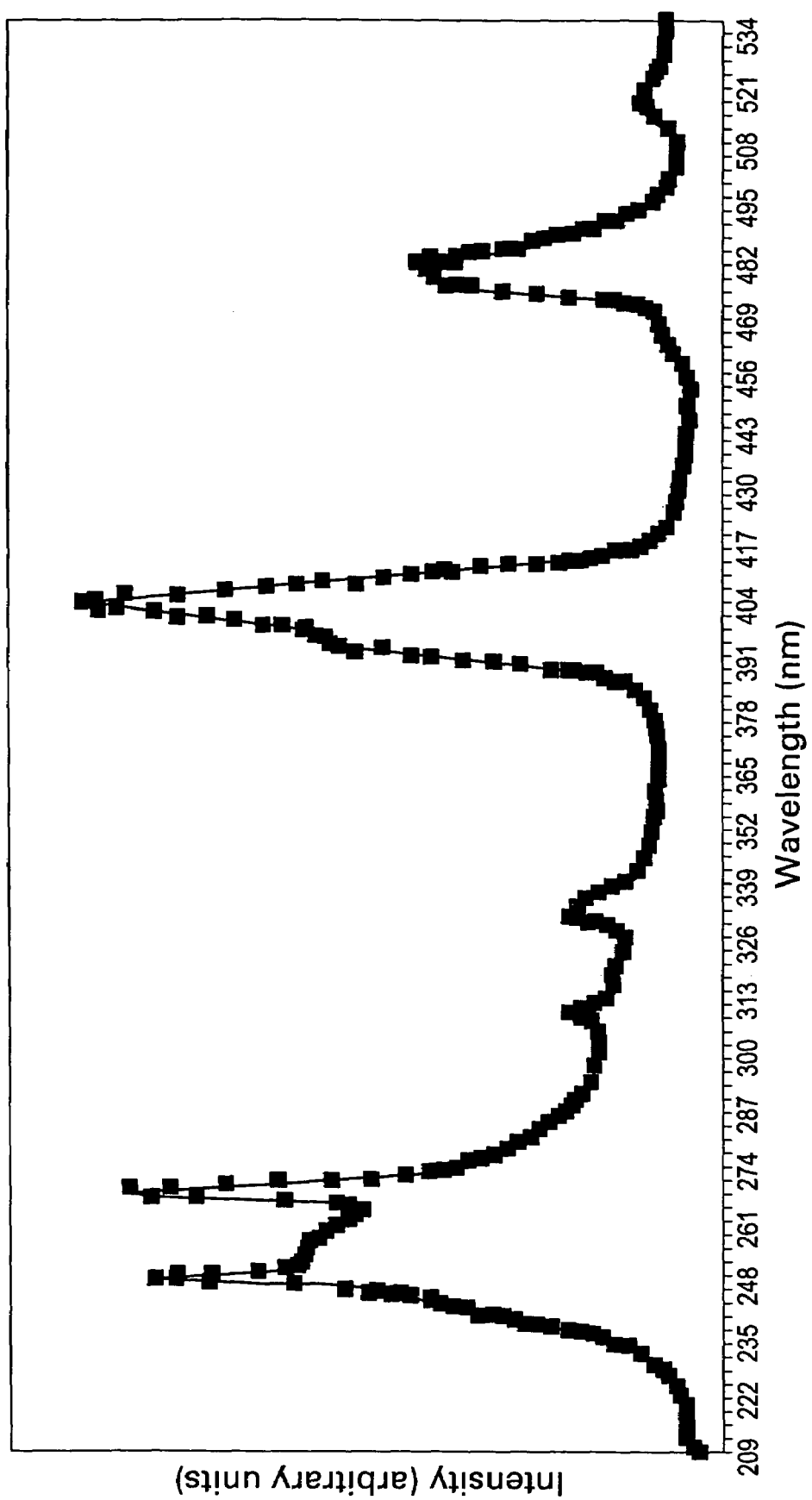
FIG. 2 shows an emission spectrum of $SrAlF_5:Pr^{3+}$ excited by VUV radiation having a wavelength of 193 nm at room temperature.

The emission spectrum of $SrAlF_5:Pr^{3+}$, shown in FIG. 2 exhibits characteristic peaks at wavelengths of about 250 nm, 270 nm, 336 nm, and 404 nm of a quantum-splitting phosphor. These emission peaks are the results of the radiative transitions $^1S_0 \to {}^3F_4$, $^1S_0 \to {}^1G_4$, $^1S_0 \to {}^1D_2$, and $^1S_0 \to {}^1I_6$, respectively, upon the radiative decay of an excited $Pr^{3+}$ ion to lower energy levels. Thus, an examination of the intensity-versus-wavelength spectrum for these peaks provides a convenient way of determining whether a material would be quantum splitting, as opposed to using the more time-consuming measurement of quantum efficiency.

In still another aspect, a method for producing a phosphor comprises: (a) providing in sealed container a mixture of fluoride compounds of each of: (1) praseodymium; (2) at least an alkaline-earth metal; and (3) at least a Group-IIIB metal; the sealed container containing an atmosphere consisting essentially of inert gas; and (b) heating the mixture in the sealed container to a temperature for a time sufficient to convert the mixture to a single-phase solid fluoride of said at least an alkaline-earth metal and said at least a Group-IIIB metal, the single-phase solid fluoride being doped with praseodymium ions.

In still another aspect, the mixture is heated to a temperature in the range from about 500° C. to about 1200° C.; preferably, from about 800° C. to about 1100° C.; and more preferably, from about 900° C. to about 1100° C.

The inert gas is selected from the group consisting of nitrogen, neon, argon, krypton, xenon, and combinations thereof.

The heating time depends to an extent on the amount of material being heated. Heating time in the range from about 1 minute to about 10 hours is adequate. In some situations, heating time may be in the range from about 1 hour to about 6 hours. In some other situations, heating time may be in the range from about 2 hours to about 5 hours.

EXAMPLE

Manufacture of $SrAlF_5$ Doped With 1 Mole Percent $Pr^{3+}$.

Stoichiometric quantities of $SrF_2$ 2.9850 g, $PrF_3$ 0.0141 g and $AlF_3$ 2.0010 g (batch size 5 g) were mixed in glove bag and blended together. The mixture was put in a silver tube (6.35 mm, 6.35 mm or 0.25 inch OD, 4.35 mm or 0.17 inch ID). Several such tubes, each containing the mixture, were prepared. The tubes containing the mixture were evacuated to a residual pressure of less than $10^{-6}$ mm Hg vacuum, then backfilled with an inert gas (high purity Argon gas), and then sealed in vacuum. The tubes were heated in a furnace at different temperatures (greater than 500° C.) for different periods of time (5 hours or longer) to get single-phase materials. The best conditions substantially to obtain single-phase materials for $SrAlF_5:Pr^{3+}$ were found to be about 920° C. for 5 hours. The phase purity of the materials was checked by the X-ray diffraction (XRD) technique.

The method of manufacture of the present invention is an advance over the prior-art method of manufacture of solid-state fluoride materials. One prior-art method of producing a solid-state fluoride material involves treating a mixture of oxides of the chosen metals under a flow of twice-distilled HF gas. Such prior-art method requires a high degree of precaution in designing the apparatus for safe handling of HF gas, thus resulting in high cost of producing large amounts of materials. The method of the present invention does not require the use of HF gas, thus lowering the risk of leakage of this hazardous material into the surroundings. In addition, the mixture is contained in a sealed silver tube, which can be recycled and reused. The solid state method of the present invention is also easily scaled up.

White Light—Emitting Device

Figure 3:
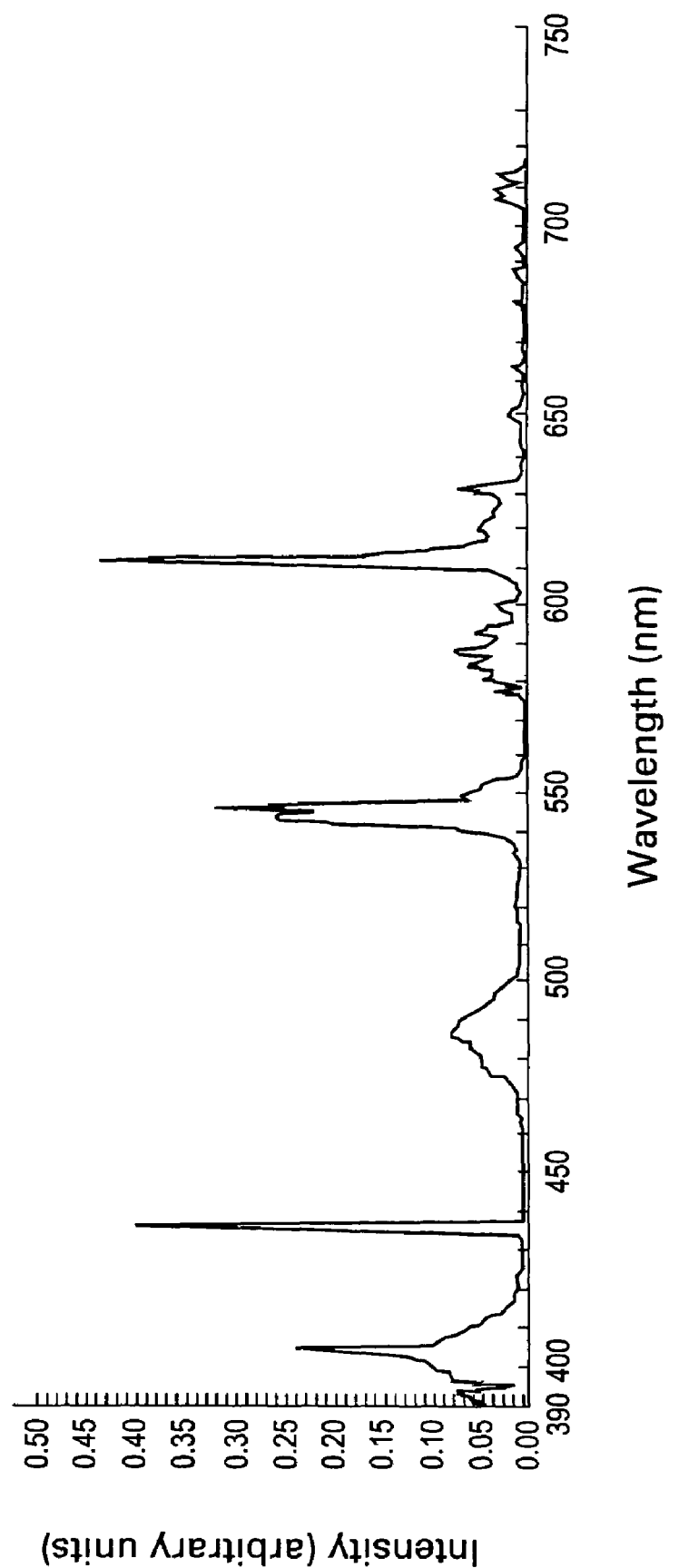
FIG. 3 shows a composite emission spectrum of a phosphor blend consisting of $SrAlF_5:Pr^{3+}$, $Y_2O_3:Eu^{3+}$, and $LaPO_4:Ce^{3+},Tb^{3+}$.

Incorporation of a blend of phosphors that comprises a quantum-splitting phosphor of the present invention (as has been disclosed herein above), a green light-emitting phosphor, and a red light-emitting phosphor in a mercury discharge device provides a white light-emitting device that can have a correlated color temperature ("CCT") in the range of 2500–10000 K, a CRI in the range of 80–95, and a high luminous output. The quantum-splitting phosphor in this blend advantageously absorbs the 185 nm emission of mercury discharge to emit in the visible range, thus increasing the energy efficiency of the mercury discharge device. For example, a blend of phosphors consisting of $SrAlF_5:Pr^{3+}$; $LaPO_4:Ce^{3+},Tb^{3+}$ (green light-emitting); and $Y_2O_3:Eu^{3+}$ (red light-emitting) produces a composite spectrum shown in FIG. 3. The proportions of the individual phosphors are such that 33.5, 33.4, and 32.3% of the composite spectrum are contributed by the phosphors $SrAlF_5:Pr^{3+}$; $LaPO_4:Ce^{3+},Tb^{3+}$; and $Y_2O_3:Eu^{3+}$; respectively. This phosphor blend produces white light having a CCT of 4000 K, a CRI of 90.5, and a luminous output of 272.8 lumen/W of radiant energy.

Green light-emitting phosphors used in a phosphor blend of the present invention preferably emit light having a peak emission in the range from about 500 nm to about 560 nm. Blue light-emitting phosphors used in a phosphor blend of the present invention preferably emit light having a peak emission in the range from about 420 nm to about 500 nm. Red light-emitting phosphors used in a phosphor blend of the present invention preferably emit light having a peak emission in the wavelength range from about 600 nm to about 625 nm.

Non-limiting examples of other green light-emitting phosphors are $GdMgB_5O_{10}:Ce^{3+},Tb^{3+}$; $CeMgAl_{11}O_{19}:Ce^{3+},Tb^{3+}$; $Ca_5(PO_4)_3(Cl,F,OH):Sb^{3+},Mn^{2+},Eu^{2+}$; $Sr_4Al_{14}O_{25}:Eu^{2+}$; and $BaAl_8O_{13}:Eu^{2+}$; and combinations thereof.

Non-limiting examples of blue light-emitting phosphors are $(Ba,Sr,Ca)_5(PO_4)_3(Cl,F,OH):Eu^{2+}$; $(Ba,Sr,Ca)MgAl_{10}O_{17}:Eu^{2+}$; $(Ba,Sr,Ca)BPO_5:Eu^{2+}$; and combinations thereof.

Non-limiting examples of blue-green light-emitting phosphors are $BaAl_8O_{13}:Eu^{2+}$; $2SrO \cdot 0.84P_2O_5 \cdot 0.16B_2O_3:Eu^{2+}$; $MgWO_4$; $BaTiP_2O_8$; $(Ba,Sr,Ca)MgAl_{10}O_{17}:Eu^{2+},Mn^{2+}$; $(Ba,Sr,Ca)_5(PO_4)_3(Cl,F,OH):Sb^{3+}$.

Non-limiting examples of red light-emitting phosphors are $(Y,Gd,La,Lu,Sc)_2O_3:Eu^{3+}$; $(Y,Gd,La,In,Lu,Sc)BO_3$:

$Eu^{3+}$; $(Y,Gd,La)(Al,Ga)O_3$:$Eu^{3+}$; $(Ba,Sr,Ca)(Y,Gd,La,Lu)_2O_4$:$Eu^{3+}$; $(Y,Gd)Al_3B_4O_{12}$:$Eu^{3+}$; monoclinic $Gd_2O_3$:$Eu^{3+}$; $(Gd,Y)_4(Al,Ga)_2O_9$:$Eu^{3+}$; $(Ca,Sr)(Gd,Y)_3(Ge,Si)AlO_9$:$Eu^{3+}$; $(Sr,Mg)_3(PO_4)_2$:$Sn^{2+}$; $GdMgB_5O_{10}$:$Ce^{3+},Mn^{2+}$; and $3.5MgO.0.5MgF_2.GeO_2$:$Mn^{4+}$.

Figure 4:
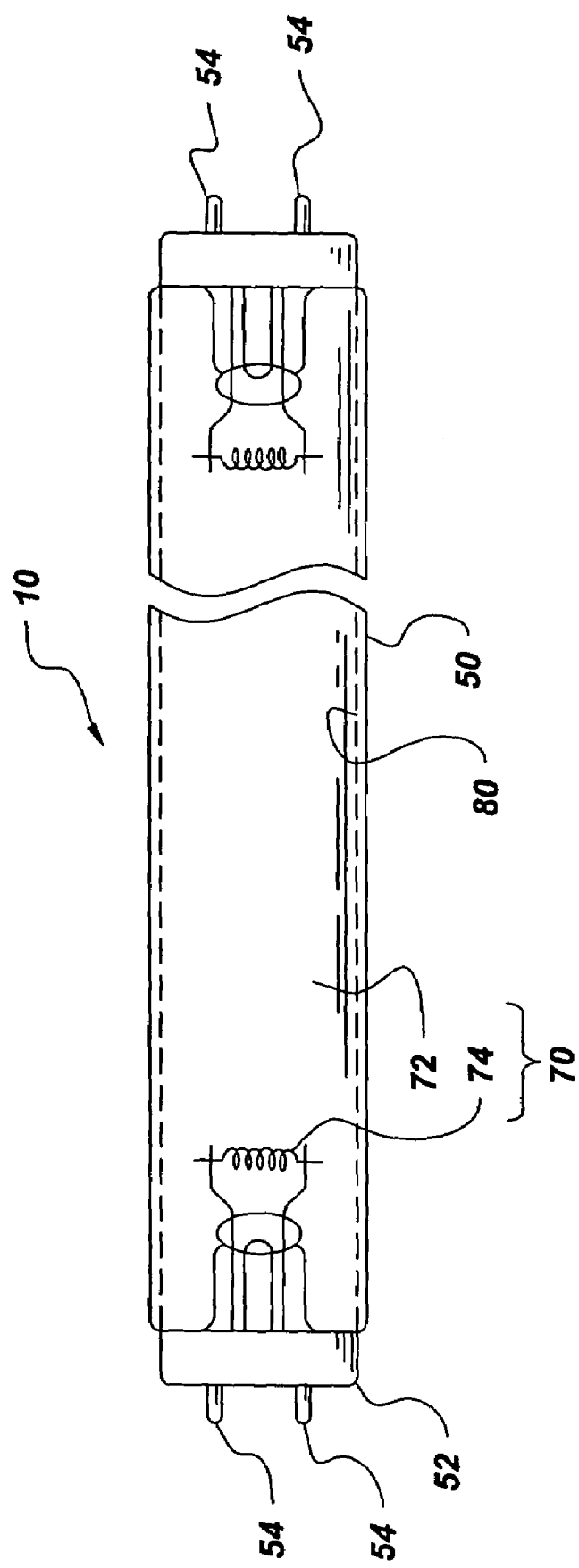
FIG. 4 shows a light source comprising a phosphor of the present invention.

In one embodiment of the present invention, a light source 10, which produces white light with a high CRI suitable for general illumination (e.g., CRI in the range from about 80 to about 100), is shown in FIG. 4. Light source 10 comprises an evacuated sealed housing 50, a means 70 for generating at least VUV radiation, which means is located within housing 50, and a phosphor blend 80 located within housing 50 and adapted to be excited by at least VUV radiation. In one embodiment, light source 10 is a fluorescent lamp and evacuated housing 50 comprises an evacuated glass tube and associated end caps 52. In another embodiment, the phosphor blend is disposed on an inner surface of housing 50. Means 70 for generating at least UV radiation is a combination of a gas comprising a means 74 for generating high-energy electrons and a means 72 for absorbing the energy of the high-energy electrons. In one embodiment, means 72 for absorbing energy of high-energy electrons is a gas comprising mercury vapor, which absorbs energy of the high-energy electrons to create a mercury vapor discharge to excite the phosphor. In addition to mercury vapor, the gas can comprise an inert gas such as argon, krypton, or xenon. Means 74 for generating high-energy electrons may be a filament of a metal having a low work function (such as less than 4.5 eV), such as tungsten, or such a filament coated with alkaline earth metal oxides as are known in the art. In such an embodiment, the mercury discharge emits both VUV and UV radiation. Pins 54 are provided to supply electrical power to electron-generating means 74. The filament is coupled to a high-voltage source to generate electrons from the surface thereof. A phosphor of the present invention may be used in combination with other conventional phosphors used in fluorescent lighting technology. For example, a phosphor of the present invention may be combined with conventional red, green, and blue light-emitting phosphors, which conventional phosphor are disclosed herein above, to produce white light from a mercury discharge lamp. A particulate material comprising $TiO_2$ and/or $Al_2O_3$ can be used in conjunction with the phosphor blend to scatter light generated by light source 10. Such a light scattering material can be blended into the phosphor blend or disposed as a layer between the inner surface of housing 50 and phosphor layer 80. Although light source 10 shown in FIG. 4 comprises a straight housing 50, it should be understood that other housing shapes also are applicable. For example, a compact fluorescent lamp can have a housing that has one or more bends, and electrical supply pins 54 are disposed at one end of light source 10.

Another light source that can incorporate a phosphor or phosphor blend of the present invention is based on cathode discharges in rare gases such as xenon, krypton, and argon.

Figure 5:
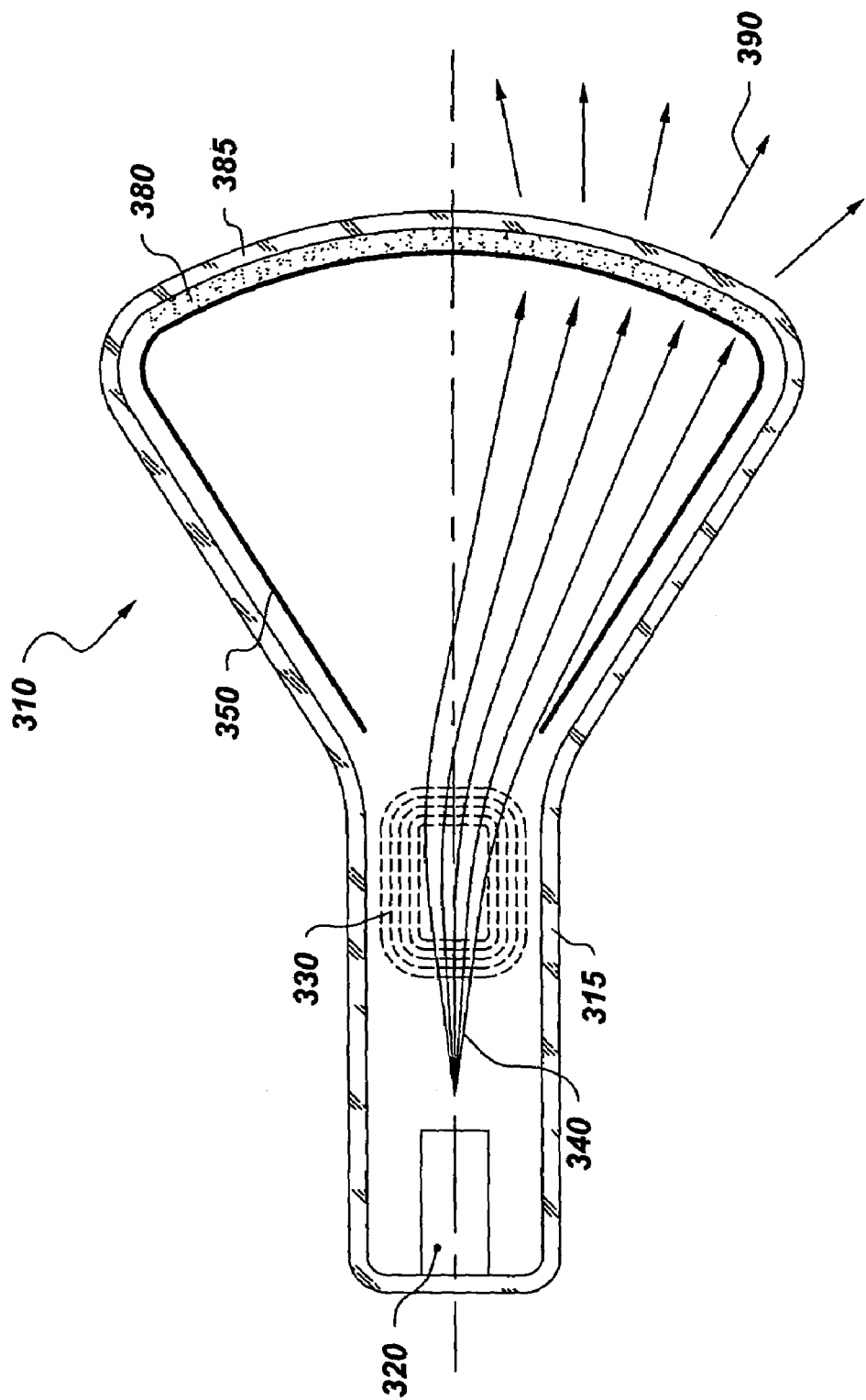
FIG. 5 shows a display that incorporates a phosphor of the present invention.

A quantum-splitting phosphor of the present invention also can be used alone or as a component of a phosphor blend for displays or cathode-ray tubes, which phosphor blend comprises blue light-emitting and green light-emitting phosphors. In this case, the high-energy electrons from an electron source bombard a screen on which a coating of the phosphor or phosphor blend is disposed to emit light in the visible spectral region. For example, FIG. 5 shows schematically a display 310 that uses a phosphor of the present invention, singly or in combination with other phosphors. Display 310 comprises a sealed housing 315, wherein an electron gun 320 is located. Electron gun 320 produces a beam 340 of high-energy electrons, which is deflected by an electromagnetic field produced by system 330. Deflected electrons accelerate toward anode 350 and impinge on a phosphor layer 380, which is disposed on an internal surface of display screen 385 to excite the phosphor in layer 380 to produce visible light 390. Phosphor layer 380 comprises at least a phosphor of the present invention. Preferably, phosphor layer 380 also comprises other phosphors emitting other primary colors to provide a color display.

While specific preferred embodiments of the present invention have been described in the foregoing, it will be appreciated by those skilled in the art that many modifications, substitutions, or variations may be made thereto without departing from the spirit and scope of the invention as defined in the appended claims.

What is claimed is:

1. A phosphor comprising a material having a formula of $ADF5$:$Pr3+$; wherein A is selected from the group consisting of Ba; Mg; Sr and Ca; Sr and Mg; Ba and Ca; Ba and Mg; Ca and Mg; Sr, Ba, and Ca; Sr, Ba, and Mg; Ba, Ca, and Mg; and Sr, Ba, Ca, and Mg; and wherein D is selected from the group consisting of Al, Ga, In, and combinations thereof.

2. The phosphor of claim 1, wherein an amount of $Pr3+$ is in a range from about 0.01 to about 10 mole percent.

3. The phosphor of claim 1, wherein A is Ba, and D is Al.

4. The phosphor of claim 1, wherein A is Mg, and D is Al.

5. The phosphor of claim 1, wherein A is a combination of Sr and Ca, and D is Al.

6. The phosphor of claim 1, wherein A is a combination of Sr and Mg, and D is Al.

7. A phosphor blend comprising:
(a) a first phosphor having a formula of $ADF5$:$Pr3+$; wherein A is selected from the group consisting of Mg, Ca, Sr, Ba, and combinations thereof and wherein D is selected from the group consisting of Al, Ga, In, and combinations thereof;
(b) at least a second phosphor selected from the group consisting of $LaPO_4$:$Ce^{3+},Tb^{3+}$; $GdMgB_5O_{10}$:$Ce^{3+},Tb^{3+}$; $CeMgAl_{11}O_{19}$:$Ce^{3+},Tb^{3+}$; $Ca_5(PO_4)_3(Cl,F,OH)$:$Sb^{3+},Mn^{2+},Eu^{2+}$; $Sr_4Al_{14}O_{25}$:$Eu^{2+}$; and $BaAl_8O_{13}$:$Eu^{2+}$; $(Ba,Sr,Ca)_5(PO4)_3(Cl,F,OH)$:$Eu^{2+}$; $(Ba,Sr,Ca)MgAl_{10}O_{17}$:$Eu^{2+}$; $(Ba,Sr,Ca)BPO_5$:$Eu^{2+}$; $BaAl_8O_{13}$:$Eu^{2+}$; $2SrO.0.84P_2O_5.0.16B_2O_3$:$Eu^{2+}$; $MgWO_4$; $BaTiP_2O_8$; $(Ba,Sr,Ca)MgAl_{10}O_{17}$:$Eu^{2+},Mn^{2+}$; $(Ba,Sr,Ca)_5(PO4)_3(Cl,F,OH)$:$Sb^{3+}$; $(Y,Gd,La,Lu,Sc)_2O_3$:$Eu^{2}$; $(Y,Gd,La,In,Lu,Sc)BO_3$:$Eu^{3+}$; $(Y,Gd,La)(Al,Ga)O_3$:$Eu^{3+}$; $(Ba,Sr,Ca)(Y,Gd,La,Lu)_2O_4$:$Eu^{3+}$; $(Y,Gd)Al_3B_4O_{12}$:$Eu^{3+}$; monoclinic $Gd_2O_3$:$Eu^{3+}$; $(Gd,Y)_4(Al,Ga)_2O_9$:$Eu^{3+}$; $(Ca,Sr)(Gd,Y)_3(Ge,Si)AlO_9$:$Eu_{3+}$; $(Sr,Mg)_3(PO_4)_2$:$Sn^{2+}$; $GdMgB_5O_{10}$:$Ce^{3+},Mn^{2+}$; and $3.5MgO.0.5MgF_2.GeO_2$:$Mn^{4+}$.

8. A phosphor blend comprising: (a) $LaPO_4$:$Ce^{3+},Tb^{3+}$; (b) $Y_2O_3$:$Eu^{3+}$; and (c) another phosphor having a formula of $ADF_5$:$Pr^{3+}$; wherein A is selected from the group consisting of Mg, Ca, Sr, Ba, and combinations thereof; and wherein D is selected from the group consisting of Al, Ga, In, and combinations thereof.

9. The phosphor blend of claim 8, wherein said another phosphor is $SrAlF_5$:$Pr^{3+}$.

10. A method for producing a phosphor comprises: (a) providing in scaled container a mixture of fluoride compounds of each of: (1) praseodymium; (2) at least an alkaline-earth metal; and (3) at least a Group-IIIB metal; the sealed container containing an atmosphere consisting essentially of inert gas; and (b) heating the mixture in the sealed container to a temperature for a time sufficient to convert the mixture to a single-phase solid fluoride of said at least an alkaline-earth metal and said at least a Group-IIIB metal, the single-phase solid fluoride being doped with praseodymium ions.

11. The method of claim 10, wherein the temperature is in a range from about 500° C. to about 1200° C.

12. The method of claim 10, wherein the mixture is heated for a in a range from about 1 minute to about 10 hours.

13. The method of claim 10, wherein the inert gas is selected from the group consisting of nitrogen, neon, argon, krypton, xenon, and combinations thereof.

14. A light source comprising:
(a) a gas discharge source that is located in a sealed housing, said UV radiation including a portion in a VUV range; and
(b) a phosphor material disposed within the sealed housing and adapted to be excited by the UV radiation and to emit visible light, wherein the phosphor material comprises a first phosphor having a formula of $ADF_5$:$Pr^{3+}$; wherein A is selected from the group consisting of Mg, Ca, Sr, Ba, and combinations thereof; and wherein D is selected from the group consisting of Al, Ga, In, and combinations thereof.

15. The light source of claim 14, wherein the phosphor material further comprises at least a second phosphor selected from the group consisting of $LaPO_4$:$Ce^{3+}$,$Tb^{3+}$; $GdMgB_5O_{10}$:$Ce^{3+}$,$Tb^{3+}$; $CeMgAl_{11}O_{19}$:$Ce^{3+}$,$Tb^{3+}$; $Ca_5(PO_4)_3(Cl,F,OH)$:$Sb^{3+}$,$Mn^{2+}$,$Eu^{2+}$; $Sr_4Al_{14}O_{25}$:$Eu^{2+}$; and $BaAl_8O_{13}$:$Eu^{2+}$; $(Ba,Sr,Ca)_5(PO_4)_3(Cl,F,OH)$:$Eu^{2+}$; $(Ba,Sr,Ca)MgAl_{10}O_{17}$:$Eu^{2+}$; $(Ba,Sr,Ca)BPO_5$:$Eu^{2+}$; $BaAl_8O_{13}$:$Eu^{2+}$; $2SrO.0.84P_2O5.0.16B_2O_3$:$Eu^{2+}$; $MgWO_4$; $BaTiP_2O_8$; $(Ba,Sr,Ca)MgAl_{10}O_{17}$:$Eu^{2+}$,$Mn^{2+}$; $(Ba,Sr,Ca)_5(PO_4)_3(Cl,F,OH)$:$Sb_{3+}$; $(Y,Gd,La,Lu,Sc)_2$:$Eu^{2+}$; $(Y,Gd,La,In,Lu,Sc)BO_3$:$Eu^{3+}$; $(Y,Gd,La)(Al,Ga)O_{3+}$:$Eu^{3+}$; $(Ba,Sr,Ca)(Y,Gd,La,Lu)_2O_4$:$Eu^{3+}$; $(Y,Gd)Al_3B_4O_{12}$:$Eu^{3+}$; monoclinic $Gd_2O_3$:$Eu^{3+}$; $(Gd,Y)_4(Al,Ga)_2O_9$:$Eu^{3+}$; $(Ca,Sr)(Gd,Y)_3(Ge,Si)AlO_9$:$Eu^{3+}$; $(Sr,Mg)_3(PO_4)_2$:$Sn^{2+}$; $GdMgB_5O_{10}$:$Ce^{3+}$,$Mn^{2+}$; and $3.5MgO.0.5MgF_2.GeO_2$:$Mn^{4+}$.

16. The light source of claim 14, wherein the phosphor material further comprises $LaPO_4$:$Ce^{3+}$,$Tb^{3+}$ and $Y_2O_3$:$Eu^{3+}$.

17. The light source of claim 14, wherein the first phosphor is $SrAlF_5$:$Pr^{3+}$.

18. A display comprising:
(a) a source of electrons; and
(b) a phosphor material disposed within the sealed housing and adapted to be excited by the electrons and to emit visible light, wherein the phosphor material comprises a first phosphor having a formula of $ADF_5$:$Pr^{3+}$; wherein A is selected from the group consisting of Mg, Ca, Sr, Ba, and combinations thereof; and wherein D is selected from the group consisting of Al, Ga, In, and combinations thereof.

19. The display of claim 18, wherein the phosphor material further comprises at least a second phosphor selected from the group consisting of $LaPO_4$:$Ce^{3+}$,$Tb^{3+}$; $GdMgB_5O_{10}$:$Ce^{3+}$,$Tb_{3+}$; $CeMgAl_{11}O_{19}$:$Ce^{3+}$,$Tb^{3+}$; $Ca_5(PO_4)_3(Cl,F,OH)$:$Sb^{3+}$,$Mn^{2+}$,$Eu^{2+}$; $Sr_4Al_{14}O_{25}$:$Eu^{2+}$; and $BaAl_8O_{13}$:$Eu^{2+}$; $(Ba,Sr,Ca)_5(PO_4)_3(Cl,F,OH)$:$Eu^{2+}$; $(Ba,Sr,Ca)MgAl_{10}O_{17}$:$Eu^{2+}$; $(Ba,Sr,Ca)BPO_5$:$Eu^{2+}$; $BaAl_8O_{13}$:$Eu^{2+}$; $2SrO.0.84P_2O5.0.16B_2O_3$:$Eu^{2+}$; $MgWO_4$; $BaTiP_2O_8$; $(Ba,Sr,Ca)MgAl_{10}O_{17}$:$Eu^{2+}$,$Mn^{2+}$; $(Ba,Sr,Ca)_5(PO_4)_3(Cl,F,OH)$:$Sb^{3+}$; $(Y,Gd,La,Lu,Sc)_2O_3$:$Eu^{3+}$; $(Y,Gd,La,In,Lu,Sc)BO_3$:$Eu^{3+}$; $(Y,Gd,La)(Al,Ga)O_3$:$Eu^{3+}$; $(Ba,Sr,Ca)(Y,Gd,La,Lu)_2O_4$:$Eu^{3+}$; $(Y,Gd)Al_3B_4O_{12}$:$Eu^{3+}$; monoclinic $Gd_2O_3$:$Eu^{3+}$; $(Gd,Y)_4(Al,Ga)O_9$:$Eu^{3+}$; $(Ca,Sr)(Gd,Y)_3(Ge,Si)AlO_9$:$Eu^{3+}$; $(Sr,Mg)_3(PO_4)_2$:$Sn^{2+}$; $GdMgB_5O_{10}$:$Ce^{3+}$,$Mn^{2+}$; and $3.5MgO.0.5MgF_2.GeO_2$:$Mn^{4+}$.

20. The display of claim 18, wherein the phosphor material further comprises $LaPO_4$:$Ce^{3+}$,$Tb^{3+}$ and $Y_2O_3$:$Eu^{3+}$.

21. The display of claim 18, wherein the first phosphor is $SrAlF_5$:$Pr^{3+}$.

* * * * *

UNITED STATES PATENT AND TRADEMARK OFFICE
CERTIFICATE OF CORRECTION

PATENT NO. : 7,208,103 B2
APPLICATION NO. : 10/917127
DATED : April 24, 2007
INVENTOR(S) : Manivannan et al.

It is certified that error appears in the above-identified patent and that said Letters Patent is hereby corrected as shown below:

In Column 5, Line 59, after "light-emitting" insert -- , red-light emitting, --.

In Column 6, Line 18, in Claim 1, delete "ADF5:Pr3+;" and insert -- $ADF_5:Pr^{3+}$; --, therefor.

In Column 6, Line 23, in Claim 2, delete "Pr3+" and insert -- $Pr^{3+}$ --, therefor.

In Column 6, Line 32, in Claim 7, delete "ADF5:Pr3+;" and insert -- $ADF_5:Pr^{3+}$; --, therefor.

In Column 6, Line 41, in Claim 7, delete "(PO4)$_3$" and insert -- $(PO_4)_3$ --, therefor.

In Column 6, Line 45, in Claim 7, delete "(PO4)$_3$" and insert -- $(PO_4)_3$ --, therefor.

In Column 6, Line 45, in Claim 7, delete "$Eu^2$;" and insert -- $Eu^{3+}$; --, therefor.

In Column 6, Line 49, in Claim 7, delete "$Eu_{3+}$;" and insert -- $Eu^{3+}$; --, therefor.

In Column 7, Line 30, in Claim 15, delete "$P_2O5$" and insert -- $P_2O_5$ --, therefor.

In Column 7, Line 32, in Claim 15, delete ":$Sb_{3+}$; $(Y,Gd,La,Lu,Sc)_2:Eu^{2+}$;" and insert -- :$Sb^{3+}$; $(Y,Gd,La,Lu,Sc)_2O_3:Eu^{3+}$; --, therefor.

In Column 7, Line 33, in Claim 15, delete "$O_{3+}:Eu^{3+}$;" and insert -- $O_3:Eu^{3+}$; --, therefor.

In Column 8, Line 20, in Claim 19, delete "$Tb_{3+}$;" and insert -- $Tb^{3+}$; --, therefor.

In Column 8, Line 24, in Claim 19, delete "$P_2O5$" and insert -- $P_2O_5$ --, therefor.

In Column 8, Line 29, in Claim 19, delete "$(Al,Ga)O_9$" and insert -- $(Al,Ga)_2O_9$ --, therefor.

UNITED STATES PATENT AND TRADEMARK OFFICE
CERTIFICATE OF CORRECTION

PATENT NO.         : 7,208,103 B2
APPLICATION NO. : 10/917127
DATED                 : April 24, 2007
INVENTOR(S)      : Manivannan et al.

It is certified that error appears in the above-identified patent and that said Letters Patent is hereby corrected as shown below:

In Column 8, Line 30, in Claim 19, delete "$Ce^{3\ +}$" and insert -- $Ce^{3+}$ --, therefor.

Signed and Sealed this

Thirtieth Day of December, 2008

JON W. DUDAS
*Director of the United States Patent and Trademark Office*